United States Patent [19]

Watkins et al.

[11] Patent Number: 4,474,129
[45] Date of Patent: Oct. 2, 1984

[54] RISER PIPE FAIRING

[75] Inventors: Louie W. Watkins, Sharon; Stephen C. Miller, Randolph, both of Mass.

[73] Assignee: W. R. Grace & Co., Cambridge, Mass.

[21] Appl. No.: 373,064

[22] Filed: Apr. 29, 1982

[51] Int. Cl.³ .............................................. E21B 33/05
[52] U.S. Cl. .................................................. 114/243
[58] Field of Search ............... 114/243, 162, 90; 244/130, 200, 35 R; 175/7; 73/188; 405/216

[56] References Cited

U.S. PATENT DOCUMENTS

| | | | |
|---|---|---|---|
| 2,397,957 | 4/1946 | Freeman | 114/243 |
| 2,891,501 | 5/1953 | Rather | 114/243 |
| 2,946,566 | 7/1960 | Samuelson | 255/2.5 |
| 2,949,090 | 8/1960 | Gerber | 114/90 |
| 3,230,184 | 1/1966 | Alford | 260/2.5 |
| 3,352,118 | 11/1967 | Burkhardt | 405/216 |
| 3,410,096 | 11/1968 | Schuh | 405/216 |
| 3,443,020 | 5/1969 | Loshigian | 114/243 |
| 3,576,295 | 4/1971 | Hale | 242/54 |
| 3,611,976 | 10/1971 | Hale | 114/243 |
| 3,717,113 | 2/1973 | Wilde | 114/243 |
| 3,729,756 | 5/1973 | Cook et al. | 441/133 |
| 3,847,104 | 11/1974 | Kaufer | 114/162 |
| 3,859,949 | 1/1975 | Toussaint et al. | 114/243 |
| 3,962,982 | 6/1976 | Marchay et al. | 114/243 |
| 4,021,589 | 5/1977 | Copley | 428/68 |
| 4,075,967 | 2/1978 | Silvey | 114/243 |
| 4,078,605 | 3/1978 | Jones | 175/7 |
| 4,155,323 | 5/1979 | Morlbach | 114/264 |
| 4,171,674 | 10/1979 | Hale | 114/243 |
| 4,398,487 | 8/1983 | Ortloff et al. | 114/243 |

OTHER PUBLICATIONS

By Fathom-PIPESTREAM TM; 7 pp. plus a front and back page.
By Fathom; Fathom "Solving Problems in Depth" Introduces Pipestream; 2 pp.
Preliminary Technical Bulletin 40-50 ECCOHIDE from Emerson & Cuming, Inc., 2 pp.
ECCOFLOAT ®Brochure, 4 pp, (332-087 on Back).
"Buoyancy Material for Offshore Riser Pipe", L. W. Watkins, Paper No. 2654.

Primary Examiner—Trygve M. Blix
Assistant Examiner—Jesûs D. Sotelo
Attorney, Agent, or Firm—Stacey L. Channing; William L. Baker

[57] ABSTRACT

A fairing for riser immersed in a fluid medium, usually fresh water or sea water. The fairing is constructed of syntatic foam and is compatible with existing systems. The fairing may be removably secured to riser buoyancy modules. The fairing has special fluid flow characteristics.

13 Claims, 13 Drawing Figures

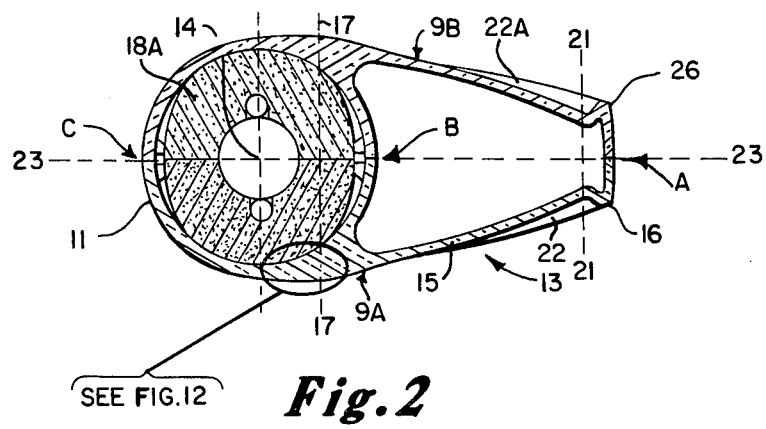
*Fig.2*
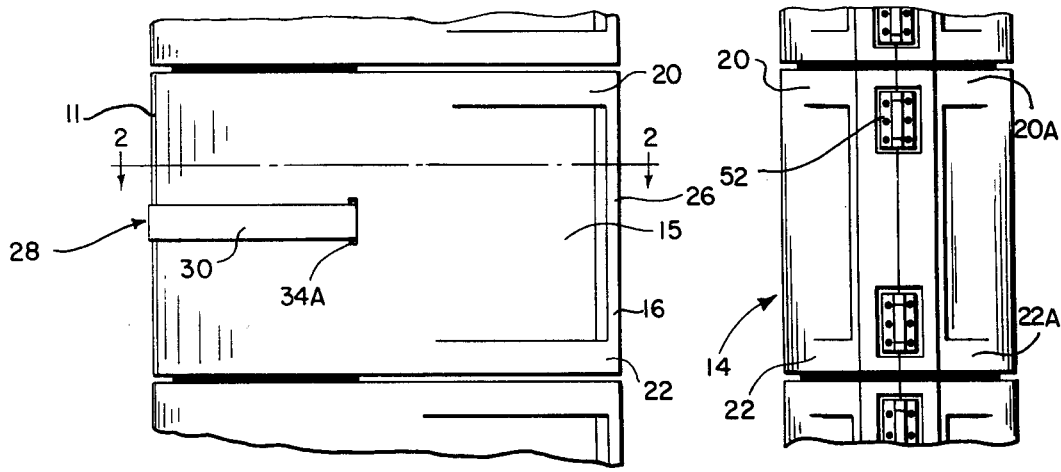
*Fig.3*   *Fig.11*
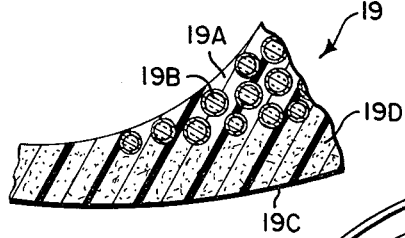
*Fig.12*
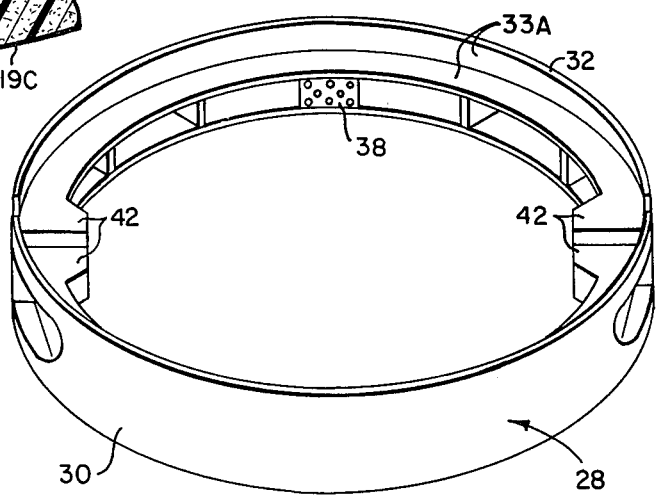
*Fig.10*

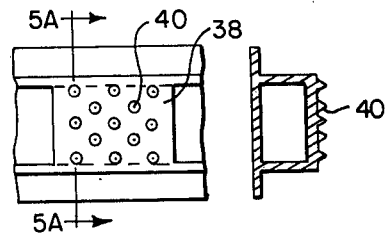
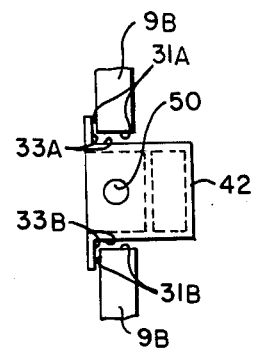
Fig.5  Fig.5A  Fig.6
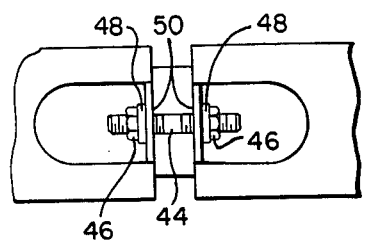
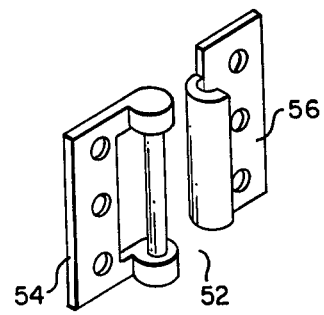
Fig.7  Fig.8
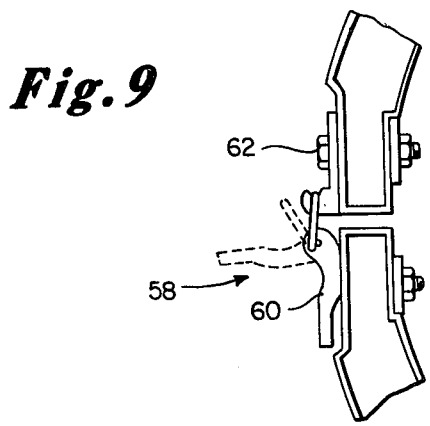
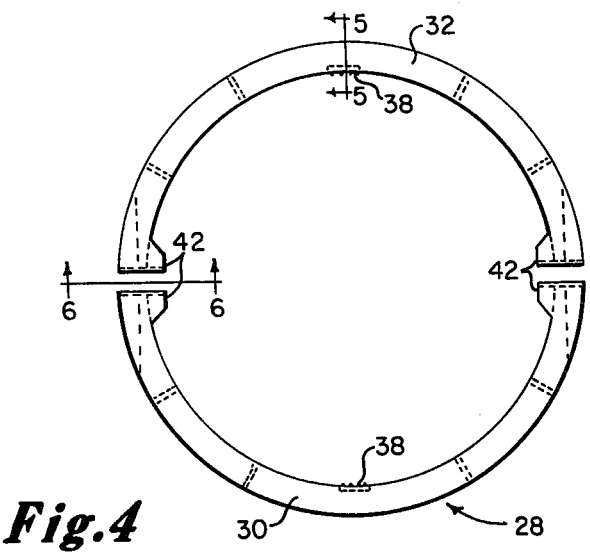
Fig.9  Fig.4

RISER PIPE FAIRING

BACKGROUND OF THE INVENTION

This invention relates to fairings for reducing drag forces on a pipe or other structural component due to relative movement of that pipe or other structural component with respect to a fluid medium in which it is immersed. The fairings disclosed herein are especially adapted to marine risers equipped with syntactic foam buoyancy modules which are used in deep water offshore drilling.

As the search for off-shore oil has led drillers into ever-deeper water, the use of buoyant riser systems has been greatly expanded. The most widely used floatation material is the family of plastic composites called syntactic foams. Syntactic foam is any materials system comprising hollow microspheres dispersed in some form of binder.

Typical syntactic foams used in hydrospace applications contain fillers in the form of tiny glass bubbles, or microspheres. Because of their small size-a diameter range of 60 to 80 microns is common-microspheres appear as fine white powder to the naked eye. The microspheres are mixed into a liquid thermosetting plastic such as epoxy or polyester resin. The resulting material may have a viscosity varying from that of heavy cream to a semi-solid paste. Once, catalyzed, the resin binder hardens so that the foam becomes a rigid mass with remarkable properties: much lighter than the plastic resin, yet much more resistant to hydrostatic pressure than were the microspheres. To further enhance the quality of lightness, plastic macrospheres (up to 3″ diameter) may be interspersed in the microspheres-resin mix.

In a typical installation, the riser pipe itself is suited with syntactic foam buoyancy modules. In the usual case 6 modules are used per riser pipe joint. The modules are hemi-cylinders, strapped or clamped to the riser pipe. In addition to supporting the riser, the modules may perform many other functions, such as cradling and protecting the auxiliary lines and providing fixation points for electric cables. It is possible to design the modules so they stiffen the riser, or, if the opposite condition is desired, so that maximum flexibility is assured. Provision is made to clear the choke and kill line clamps and any other fixtures on the riser. Adequate room is left at either end of the riser for make-up and running: the lower end accommodates air wrenches or other tools used when assembling joints, and the upper end clears the spider dogs.

A typical syntactic foam riser module designed to provide 98% buoyancy for an 18.625 inch (diameter) 50 foot (length) marine riser may have the following specifications:

| | |
|---|---|
| Diameter | 38 inches |
| Length | 15 feet |
| Weight | 1150 lbs. |
| Buoyancy | 1420 lbs. |
| Maximum Service Depth | 3000 feet |
| Ultimate or Crush depth | 5000 feet |

Riser pipes are now being used at ocean depths of up to 5,000 feet. At these depths it is considered mandatory to use buoyancy means with the riser. Substantial water drag and vortex shedding vibration induced by currents present a great danger to riser pipes of such great length. The vortex shedding vibration causes the riser pipe to shake, which leads to fatigue, which eventually leads to deterioration of the steel in the pipe. Hollow two piece fairings of the usual shape, having ribs and made with solid plastic wall have been used for many years to protect riser pipes, including riser pipes equipped with syntactic foam buoyancy modules.

An object of the invention is to provide a fairing that has superior operation and a reduced front to rear chord length.

Another object of the invention is to provide a fairing constructed of low density material and having adequate strength for long use with repeated installation and removal.

Yet another object of this invention is to provide a fairing for a marine riser which exhibits neutral buoyancy without the addition of separate buoyancy materials.

A further object of the invention is to provide a fairing assembly that may be easily attached and removed from a marine riser.

A still further object is to provide a fairing which is compatible with syntactic foam buoyancy material.

Still another object is to provide a fairing which can be used for a broad range of risers, both buoyant and non-buoyant, since existing fairing systems are not easily adaptable to different types of risers.

SUMMARY OF THE INVENTION

By an aspect of the invention a fairing is provided that is removably mountable on risers equipped with buoyancy modules. The fairing has means for mounting the fairing so that its subsequent removal leaves an unencumbered riser flotation module surface. The means preferably includes at least one substantially annular surface sized to encompass an intended buoyancy module and provide a 360° arc of rotation for the fairing about the buoyancy module. The substantially annular bearing surface preferably has at least two opposed spikes attached to it and projecting inwardly.

The fairing is preferably divided vertically into two parts and the means for removably mounting the fairing is also divided into two parts, one of the parts of the removable mounting means being engaged with one of the fairing parts and the other of the parts of the removable mounting means being engaged with the other of the fairing parts. The two parts of the removable mounting means are held in their respective fairing parts at least in part by engagement in a curved matingly configured channel in the respective fairing part.

By another aspect of the invention a fairing is provided having a tail tapering aft and a fin aft of the tail. The fin is wider in general dimension than the portion of the tail directly adjacent thereto. In the preferred fairing the fairing's greatest width is aft of the fairing's vertical axis and the fairing has a rounded nose which is forward of the tail, integral with the tail, and merges directly into the tail at an imaginary line extending vertically through the fairing, across the width of the fairing at the axis. The axis is preferably the axis of rotation.

In a preferred aspect of the invention the fairing's tail is truncated at it terminus and the fin has a terminus that defines a substantially truncated shaped fairing. Preferably at least one rib projects horizontally from the side of the fairing.

By another aspect the fairing is preferably hollow and has a monolithic syntactic foam construction. The syntactic foam is made from glass microspheres and a binder. Preferably the fairing's construction also includes fiberglass in its outer skin.

BRIEF DESCRIPTION OF THE DRAWING

FIG. 2 is a sectional view on line 2—2 of FIG. 3 with the riser, buoyancy module latch assembly 28 omitted.

FIG. 3 is a side elevation of the fairing.

FIG. 4 is a plan view of the bearing/attachment assembly

FIG. 5 is a sectional view taken along line 5—5 of FIG. 4.

FIG. 5A is a sectional view taken along line 5A—5A of FIG. 5.

FIG. 6 is a sectional view taken along line 6—6 of FIG. 4 showing the bearing surfaces of the fairing body in relation to the bearing surfaces of the bearing/attachment assembly.

FIG. 7 is a view in elevation of the means for joining the two halves of the bearing/attachment assembly.

FIG. 8 is a perspective view of the hinge assembly used to join the fairing halves aft.

FIG. 9 is a plan view of the latch assembly used to join the fairing halves at the nose.

FIG. 10 is a perspective view of the bearing/attachment assembly.

FIG. 11 is an aft or rear view of the fairing.

FIG. 12 is an enlarged diagrammatic illustration section of a portion of the fairing body in section of FIG. 2.

PREFERRED EMBODIMENT

Figure 1:
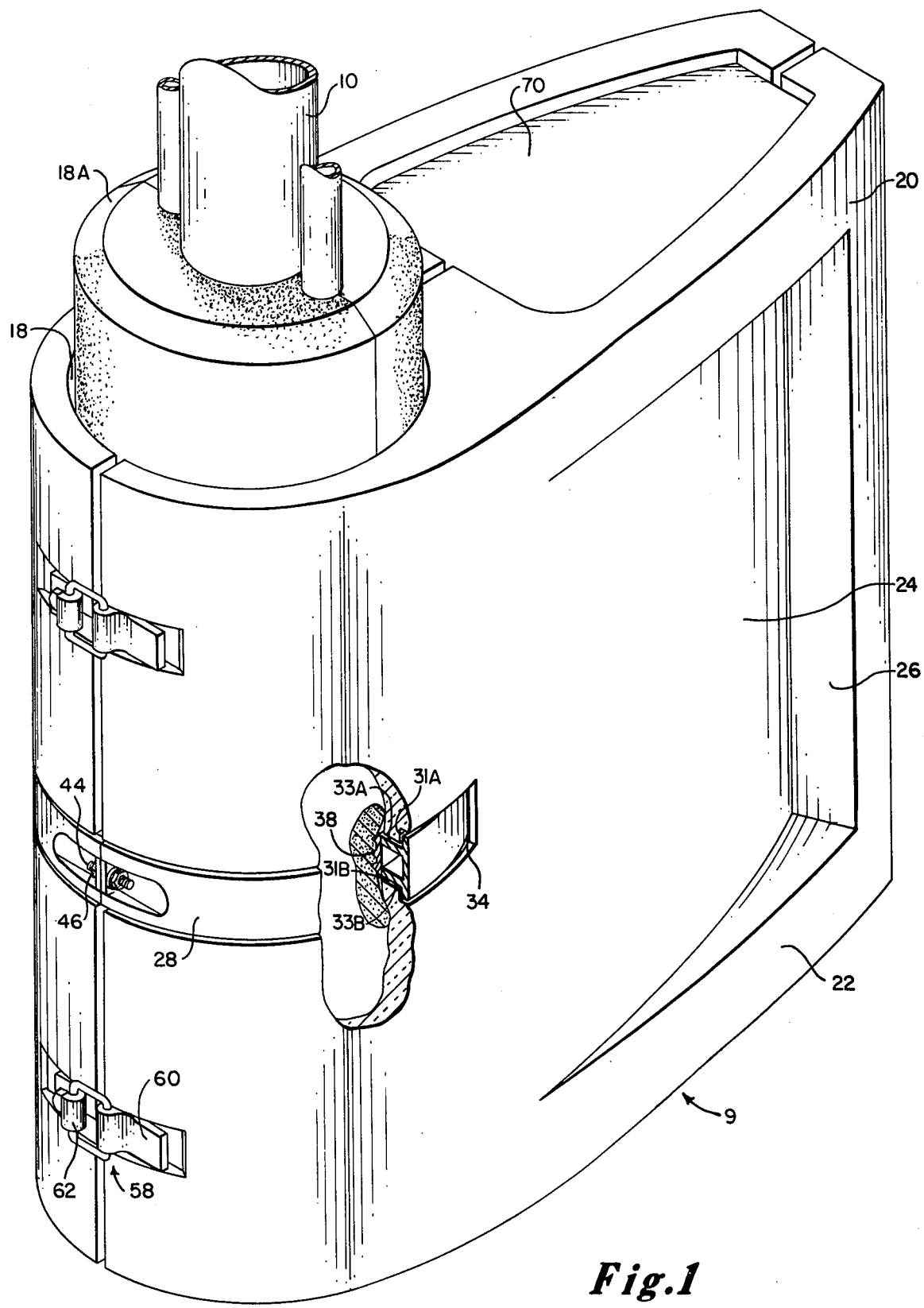
FIG. 1 is a perspective view of the fairing installed on a riser.

The present invention in a preferred form is a fairing 9 (FIG. 1) for use with riser pipes 10 which are utilized in drilling oil wells in off-shore locations. The fairing 9 has a nose portion 11, and an aft section 13. The nose portion 11 (FIG. 2) is the portion of the fairing 9 forward of the fairing's axis of rotation 14. The aft section 13 is the portion of the fairing 9 aft of the fairing's axis of rotation. The aft portion is made up of a tail section 15 and a fin section 16. The nose 11 is formed integral (monolithic) with and is forward of the tail 15. The tail section 15 tapers aft and the fin 16 is wider in general dimension than the portion of the tail 15 directly adjacent thereto. The fin 16 projects laterally from opposing sides of the fairing 9 aft of said taper as shown in FIG. 2. By wider in general dimension it is meant that the breadth of the fin is greater than the adjacent portion of the tail, both being considered with respect to their general dimension, not counting ribs, holes, cut through portions and the like. A fin is distinct from a wing in that the fin is relatively continuously connected to that portion of the fairing adjacent to it.

The fairing 9 may be seen to have its greatest breadth or thickness at line 17—17 which is aft (to the rear) of the fairing's axis of rotation 14. Reference to breadth, length, rear, forward, horizontal, vertical and like directions of dimension are given in this application with reference to the fairing as illustrated in the drawings. Obviously the fairing can be positioned in different orientations and thus it is to be understood that the dimensions are to be read logically on an equivalent fairing part oriented as nearly as possible to the position depicted in the drawings.

The fairing's axis of rotation, in the preferred embodiment illustrated, is at the center of the axis of the channel 18. As shown the openings defining the channel 18 are round and thus the channel through the vertical dimension of the fairing may be considered cylindrical. Although not shown the wall continues around so that the cylindrical channel is defined by a wall on the inside of the fairing. This is of course not required and the channel could open into the larger hollow body of the fairing 9. The channel 18 accommodates the riser pipes 10. The channel can, of course, be sized or shaped to accommodate a riser pipe bundle or auxilary lines, etc. The riser pipe 10 or pipe bundle is preferably fitted with syntactic foam buoyancy modules 18A.

The hollow body shell wall 19 (FIG. 12) defining the fairing body of the fairing 9 has as its major structural constituent syntactic foam 19A. The syntactic foam 19A is made from two constituents, glass microspheres and binder. Larger macrospheres 19B may also be included as a constituent of the fairing body. The proportions of these materials are varied to provide the desired density. A skin 19C reinforced with fiberglass is formed integral with and preferably joined directly with at least the majority of the outer surface of the fairing body. The fiber glass reinforcement is preferably integrated with and made monolithic with the body of the syntactic foam by the same binder as the binder of the syntactic foam. This merging may be seen at 19D of FIG. 12. The fiberglass is impregnated with the binder and has only a relatively small amount of the microspheres in it due to the filtering out or blocking of the microspheres as the binder flows into or impregnates the fiberglass.

In the embodiment of the fairing 9 shown in FIG. 3, the tail 15 has two outwardly or horizontally projecting rib portions 20,22 that merge with the fin 16. It will be understood that an identical set of ribs project from each side of the fairing's tail 15, one at the top of the tail and the other at the bottom thereof. This is illustrated in FIG. 2 where ribs 22 and 22A are shown on the right and left sides of the fairing 9 respectively. FIG. 11 shows the upper left side rib 20A and the lower left side rib 22A if the fairing was viewed from the nose rather than the aft view as shown. Rib 20 is thus considered the upper right side rib and rib 22 the lower right side rib. Each of the ribs 20, 22, 20A and 22A extend aft and merge directly into and integrally with the fin 16 at imaginary line 21—21 (FIG. 2) which extend vertically down through the fairing from its top to its bottom.

The tail 15 of the fairing is truncated at line 21—21 which line is also considered to delineate the terminus of the tail 15 and the beginning of the fin 16. The fin 16 is also truncated at its terminus thus truncating the aft section 13 of the fairing 9. This provides the entire fairing with a shape that can be defined as substantially truncated.

The fairing 9 is preferably removably attached to or mounted on the riser 18 and riser or buoyancy module 18A by means of its bearing/attachment assembly 28 (see FIG. 1). This means preferably allows the fairing to rotate about a vertical axis of rotation in an arc of 360. The bearing/attachment assembly 28 thus serves the dual functions of joining the body of the fairing 9 to the riser piper 10 and buoyancy module 18A and guiding the body of the fairing 9 about riser pipe 10. The bearing/attachment assembly 28 is in the configuration of an annular ring. The diameter of the ring varies with the diameter of the riser pipe 10 and buoyancy module 18A. The bearing/attachment assembly 28 is preferably made of a light, durable metal such as aluminum. It may be made of many other materials depending on cost, corrosion characteristics and other parameters obvious to those skilled in the art.

Like the fairing body, the fairing's bearing/attachment assembly 28 is for convenience made in two halves 30, 32 (See FIGS. 4 and 10). Each fairing body half or part 9A and 9B (FIG. 2) may be expediously equipped with a bearing/attachment assembly half prior to installation upon the riser 10. The bearing/attachment assembly half 30 is placed or slip threaded through a notch or configured slip retaining slot or channel 34 in the fairing body half 9A (see FIG. 3). Likewise, the bearing/attachment assembly half 32 is placed or slip threaded through a notch or configured slip retaining slot or channel (not shown) in the fairing body half 9B. The notch in fairing body half 9B is the mirror image of notch 34 in fairing body half 9A.

It will be understood looking at FIGS. 1, 6 and 10 that the engagement of a bearing/attachment assembly half in a respective matingly configured slip retaining slot provides that bearing surfaces 31A and 31B of the slot 34 engage or mate with bearing surfaces 33A and 33B of the bearing/attachment assembly 28. The engagement of these mating bearing surfaces provides the supported rotation of the fairing body about its axis of rotation. The curvature of the configured channel is also important in the retention of the bearing/attachment assembly half in the fairing body half prior to joining the halfs together. When the bearing/attachment assembly halfs are joined, a substantially annular bearing surface is provided, sized to encompass the intended buoyancy module and provide a 360° arc of rotation for the fairing about the buoyancy module.

Each bearing/attachment assembly half 30, 32 is equipped with a grip plate 38 (see FIGS. 4, 5 and 5A). It will be seen that the grip plates 38 of the two halves face or are opposed to one another. The grip plate 38 comprises a plurality of spikes 40. The spikes 40 project inwardly and penetrate the syntactic foam of the riser module 18A on assembly, thereby aiding in fixedly holding the bearing/attachment assembly halves 30, 32 to the buoyancy module 18A. Upon removal the spikes are withdrawn from their penetration of the syntactic foam and the riser flotation module surface is left unencombered by this removable mounting.

If the buoyancy modules 18A have an elliptical cross-section, it is desirable to equip the bearing/attachment assembly halves 30, 32 with standoff cleats 42 (see FIG. 6). These cleats 42 have the effect of increasing the minor radius of the elliptical module 18A, thus allowing the bearing/attachment assembly halves 30, 32 to be in secure contact with the buoyancy module 18A. The cleats 42 are preferably made of the same material as the bearing/attachment assembly halves 30, 32 and are joined to the bearing/attachment assembly halves 30, 32 by means of welding or the like.

The bearing/attachment assembly halves 30, 32 are joined to each other to form the annular ring configuration by means of threaded rods 44 with nuts 46 and lock washers 48 (see FIG. 7). Openings 50 are provided in the bearing/attachment assembly halves 30, 32 to accept the threaded rods 44.

A means for adjusting the bearing/attachment assembly to provide mounting of a fairing on buoyancy modules of differing sizes and configurations is by offsetting the grip plates inwardly of the annular bearing surface. This may be done by attaching the grip plates to means such as cleats 42 projecting inwardly the needed amount.

The fairing halves are shown in FIG. 11 to be equipped with at least one hinge assembly 52 FIG. 8. A plurality of hinge assemblies are usually employed to provide adequate strength. The hinge assemblies 52 are located at the terminal end of the aft section 13 of the fairing 9. Each hinge assembly 52 comprises a pivot 54 and a catch 56. The pivot 54 may be attached to either fairing half. The catch 56 is attached to the other fairing half.

The fairing halves are shown in FIG. 1 to be equipped with at least one quick release assembly 58 FIG. 9. A plurality of quick release assemblies are usually employed to provide adequate strength. The quick release assemblies 58 are located at the nose 11 of the fairing 9. The quick release assembly comprises a draw arm 60 and a retainer 62. The draw arm 60 may be attached to either fairing half. The retainer 62 is attached to the fairing half that does not include the draw arm 60.

The proportioning and detailed relative dimensions of the fairing 9 are important to providing optimum performance. The aspect ratio of the fairing is defined as the ratio of length to breadth of the fairing when viewed from above or below as shown in FIG. 2. The breadth is the greatest width of each respective cross-section being referred to, for example at line 17—17 of FIG. 2. The length is the chord length taken along the front-to-rear axis of the fairing from the front thereof to the rearmost point, for example at line 23—23 of FIG. 2. The aspect ratio of the fairing of the present invention in a preferred form range from about 2.05:1 to about 2.17:1. When the riser pipe 10 and buoyancy module 18A combination has an outside diameter of about 40 inches, the preferred aspect ratio is about 2.05:1. When the riser pipe 18 buoyancy module 18A combination has an outside diameter of about 38 inches, the preferred aspect ratios is about 2.17:1.

If the outside diameter of the module-equipped riser exceeds 40 inches, and if the length of the fairing cannot be increased because of restrictions imposed by the template guidelines which conventionally are about 6 ft. radially from the center of the well bore of the drilling platform, then the aspect ratio must of necessity drop below 2:1, this greatly reduces the performance capacity of the fairing. The efficiency of a fairing increases as the aspect ratio increases. If the breadth of the fairing is increased while the front-to-rear axis of the fairings is held constant, the aspect ratio of the fairing decreases, and, in turn, the efficiency of fairing decreases.

In the preferred embodiment, the tail 14 is truncated at a point of the taper of the tail where the width of the fairing 9 is preferably equal to about 15 percent to about 45 percent, more preferably about 30% of the maximum diameter or breadth of the fairing 9. From the point of truncation, the fin 16, which is integrally molded to the tail 14, aids in generating an adequate turning moment.

The material used in making the fairing 9 is preferably the same syntactic foam used in making the buoyancy modules 18A. Of course, it is not required that the fairing and buoyancy modules 18A be made of the same material, although it is preferred.

The fairing halves 9A and 9B may have webs or interior ribs (not shown) integrally molded to the inner walls of the tail section 14. There are approximately three to five interior ribs per fairing in preferred embodiments. The purpose of the ribs or webs is to improve the structural integrity of the tail section 13. Without the webs or interior ribs, the tail section 14 may be too weak for certain applications.

The syntactic foam is made from a hardenable resin or binder loaded with extremely small hollow glass microspheres. Larger hollow macrospheres may also be included to lower the density of the syntactic foam. The resin may be polyester, epoxy, phenolic, urethane, or another exothermically hardening resin. The hardening process may be assisted by a heat cure.

Many different types of microspheres may be incorporated in the resinuous material to form a suitable syntactic foam. Suitable microspheres are disclosed in U.S. Pat. No. 3,230,184 to H. E. Alford et al, the disclosure of which is incorporated herein by reference, and are commercially available from, for example, Emerson & Cuming, Inc., Division of W. R. Grace & Co. Canton, Mass., under the trademark "MICROBALLOONS". Microspheres which are made of ceramic or film-forming polymeric materials are also suitable for preparing syntactic foam.

To prepare the fairing halves 9A and 9B the syntactic foam is preferably cast or poured into a mold having the desired dimensions and shape of the fairing halves. The preferred construction of the fairing halves is according to U.S. Pat. No. 4,021,589, the disclosure of which is incorporated herein by reference. A mold in the shape of a fairing half is lined with fiberglass. Then the mold is packed with buoyant bodies or macrospheres 19B. After this the slurry of binder and microspheres (the pre syntactic foam) is injected into a wide portion of the mold. The slurry fills the mold flowing around the macrospheres with the binder flowing through the fiberglass carrying a diminishing proportion of microspheres as it penetrates deeper into the fiberglass. It is believed that the binder in the skin region contains an average of approximately 10% microspheres and that the binder in the main buoyant portions of the fairing contains approximately 60% microspheres. The syntactic foam is then allowed to cure, i.e. harden. The mold is then opened and the hardened fairing half is removed and postcured.

INSTALLATION

It is a relatively simple operation to attach the preferred fairing 9 to the riser pipe 10 in a preferred installation. The riser pipe 10 which is equipped with syntactic foam buoyancy modules 18A is lowered into position. The fairing half 9A is placed on the module equipped riser pipe 10. The bottom of the fairing half 9A should be placed flush with the bottom of the buoyancy module 18A. Fairing half 9A is equipped with bearing/attachment assembly half 30. Fairing half 9B which is equipped with bearing/attachment assembly half 32, is connected to fairing half 9A by means of the hinge assemblies 52 located at the aft section 13 of the fairing 9 (see point A in FIG. 2). The fairing half 9B is then swung into place around the buoyancy module 18A. The two halves 30, 32 of the bearing/attachment assembly 28 will come together at points B and C (see FIG. 2). The quick release assemblies 50 are locked to secure fairing half 9A to fairing half 9B. The bolted connection of the bearing/attachment assembly halves 30, 32 at point C is then made. In order to make the bolted connection of the bearing/attachment assembly halves 30, 32 at point B, the fairing 9 should be rotated around the bearing/attachment assembly 28, until the position that was at point B appears outside the body of the fairing 9. The other bolted connection is then made. The fairing 9 can then be put in service or lowered so that additional fairings can be attached.

EXAMPLE FAIRING

A fairing has been constructed to be mounted on a syntactic foam buoyancy module having a diameter of 40 inches (3 ft. 4 in.) and a height of 15 feet. The fairing had a height of 58 inches (4 ft. 10 in.), a chord length of 92 inches (7 ft. 8 in.), a width at the axis of rotation of 44 inches (3 ft. 8 in.), a width at the widest breadth of 45.75 inches (3 ft. 9.75 in.), a width at truncation of 13.75 inches (1 ft. 1.75 in.), an aspect ratio of 2.01:1, a truncation breadth ratio to maximum breadth of 30%, a tail width of 21 inches with the tail extending outwardly from the truncation at an angle of 45°, the channel diameter was 41 inches (3 ft. 5 in.) and the wall thickness of the fairing in the nose region of 1.5 inches.

Many variations are possible within the perview of the present invention. For example the entire nose of the fairing can be omitted and the riser pipe 10 and buoyancy modules 18A can serve as the forward position of the fairing with proper mounting. If the fairing is to be used in a setting where 360° rotation is not needed then the fairing can be mounted with limited or in some instances even no rotation provided about its axis. In this instance the axis (axis of rotation) is to be considered the center of the riser. Also as shown in FIG. 1, additional openings or channels 70 may be provided in the fairing 9 to allow rapid flooding during emmersion and draining withdrawal.

The present invention provides fairings that have reduced coefficients of drag, move the forces of turbulance toward the rear away from the item (pipe, etc.) being protected, and provide the best combination or trade off between turning moment and drag. Further the construction enables a matching of buoyancy properties to site of use with sufficient strength and long life and ease of repeated use. The fairing of the present invetion can also provide buoyancy if desired. The fairing can be adapted to a great variety of risers, both with and without buoyancy. The fairings can be installed without prior adaption of the riser or buoyancy modules and when removed, leave no appurtenances which may be subject to handling damage. The fairings are highly efficient and can be quickly installed and removed. A fairing system has been provided that is removable, universal and reusable.

It will be obvious to those skilled in the art that various changes and modifications may be made in the invention without departing from its true spirit and scope. It is therefore, aimed in the appended claims to cover all such equivalent variations, as fall within the true spirit and scope of the invention.

It is claimed:
1. A fairing having a substantially neutral buoyancy for removable mounting on risers equipped with syntactic foam buoyancy modules, said fairing comprising an axis of rotation, a widest dimension aft of said axis of rotation, a diminishing taper aft of said widest dimension, a fin projecting laterally outward from opposing sides of the fairing aft of said taper, a rounded nose forward of said axis of rotation, and an assembly means for removable mounting said fairing, said assembly means having means for gripping the buoyancy modules fixedly and means allowing the rotation of said fairing about said axis of rotation in an arc of 360°, wherein said fairing comprises syntactic foam as its major structural constituent, said fairing comprises two halves divided at about the chord of the fairing, each half having at least one configured slip retaining slot formed therein and said assembly means comprises two halves, each half being engaged in slip threaded engagement in a respective said configured slip retaining slot.

2. The fairing of claim 1 wherein the respective configured slip retaining slots have bearing surfaces which are engaged with bearing surfaces of the respective assembly means halves.

3. The fairing of claim 1 wherein the aspect ratio of the fairing is between about 2.05:1 to about 2.17:1.

4. The fairing of claim 1 wherein the width of the diminishing taper at its most diminished point is between about 0.15 to about 0.45 times the widest dimension of said fairing.

5. A fairing comprising a fairing body and means for removably mounting said fairing body on risers equipped with buoyancy modules leaving an unencumbered riser buoyancy module surface, said means for removably mounting said fairing body being held within the fairing body by engagement in a channel in said fairing body.

6. The fairing of claim 5 wherein said means comprise at least one substantially annular bearing surface sized to encompass an intended buoyancy module and provide a 360° arc of rotation for the fairing about the buoyancy module.

7. The fairing of claim 6 wherein said substantially annular bearing surface has at least two opposed spikes attached to it and projecting inwardly.

8. The fairing of claim 7 wherein said opposed spikes are each members of a separate group of opposed spikes attached to a grip plate and adjustable means are provided to mount said fairing on buoyancy modules of differing sizes and configurations by offsetting said grip plates inwardly of said annular bearing surface.

9. The fairing of claim 5 wherein said fairing body is divided vertically into two parts, said means for removably mounting said fairing is divided into two parts, said channel in said fairing body comprises two slots, one slot of which is in one fairing body part and the other slot of which is in the other fairing body part, one of said parts of said removable mounting means is held within one of said fairing body parts by engagement in the slot in said fairing body part, and the other of said parts of said removable mounting means is held within the other of said fairing body parts by engagement in the slot in said other fairing body part.

10. The fairing of claim 5 wherein said means consist essentially of a single annular ring, joining means for joining and separating said ring into parts and impinging means for connecting said ring to said buoyancy module by penetrating the outer surface of said buoyancy module.

11. The fairing of claim 5 wherein said fairing comprises syntactic foam as its major constituent.

12. A fairing comprising an axis of rotation, a widest dimension aft of said axis of rotation, a diminishing taper aft of said widest dimension, a fin projecting laterally outward from opposing sides of the fairing aft of said taper, and means for allowing said fairing's rotation about a vertical axis in an arc of 360°, wherein said means for allowing rotation includes a channel with said axis of rotation being the center of said channel and annular assembly means for securing said fairing to a linear object in said channel about which said fairing is to rotate, said assembly means being adapted to fit varying sizes of riser pipes equipped with syntactic foam buoyancy modules and said assembly means having a plurality of grip plates attached to the inner periphery thereof, said grip plates having a plurality of spikes for gripping syntactic foam buoyancy modules.

13. The fairing of claim 12 wherein the assembly means has a plurality of cleats attached to the inner periphery thereof, whereby said assembly means may be accomodated to riser pipes and buoyancy modules having a cross-section dissimilar from the cross-section of the assembly means.

* * * * *